United States Patent [19]

Okaue et al.

[11] Patent Number: 5,622,784
[45] Date of Patent: Apr. 22, 1997

[54] SYNTHETIC RESIN OPHTHALMIC LENS HAVING AN INORGANIC COATING

[75] Inventors: Etsuo Okaue; Mikito Nakajima; Satoshi Kubota; Takao Mogami, all of Nagano-ken, Japan

[73] Assignee: Seiko Epson Corporation, Tokyo, Japan

[21] Appl. No.: 183,105

[22] Filed: Jan. 18, 1994

Related U.S. Application Data

[63] Continuation of Ser. No. 20,181, Feb. 16, 1993, abandoned, which is a continuation of Ser. No. 759,990, Sep. 16, 1991, abandoned, which is a continuation of Ser. No. 3,883, Jan. 16, 1987, abandoned.

[30] Foreign Application Priority Data

| Jan. 21, 1986 | [JP] | Japan | 61-010468 |
| Feb. 3, 1986 | [JP] | Japan | 61-021381 |
| Feb. 3, 1986 | [JP] | Japan | 61-021382 |
| Apr. 21, 1986 | [JP] | Japan | 61-091568 |

[51] Int. Cl.$^6$ ............................ B32B 9/04; G02C 7/10; G02C 11/08
[52] U.S. Cl. ................ 428/447; 428/689; 427/164; 351/44; 351/62; 351/166
[58] Field of Search .................. 428/411.1, 412, 428/446, 447, 448, 688, 429; 106/287.1, 287.11, 287.12, 287.14, 287.16; 351/44.62, 166, 44, 62; 427/164

[56] References Cited

U.S. PATENT DOCUMENTS

| T954,010 | 1/1977 | Brunner et al. | 427/335 |
| 2,553,314 | 5/1951 | Haber | 428/429 |
| 3,012,006 | 12/1961 | Holbrook et al. | 428/264 |
| 3,244,541 | 4/1966 | Fain et al. | 106/13 |
| 3,442,664 | 5/1969 | Heine | 106/287.14 |
| 3,579,540 | 5/1971 | Ohlhausen | 425/447 X |
| 3,900,672 | 8/1975 | Hammond et al. | 351/62 |
| 3,959,563 | 5/1976 | Vaughn, Jr. et al. | 428/429 |
| 4,196,246 | 4/1980 | Takayama | 427/164 X |
| 4,267,213 | 5/1981 | Beck et al. | 427/292 |
| 4,338,377 | 7/1982 | Beck et al. | 428/428 |
| 4,410,563 | 10/1983 | Richter et al. | 427/108 |
| 4,599,272 | 7/1986 | Ichikawa | 428/448 X |
| 4,609,267 | 9/1986 | Deguchi et al. | 351/166 X |
| 4,944,962 | 7/1990 | Furuta et al. | 427/164 |
| 5,061,769 | 10/1991 | Aharoni | 526/245 |
| 5,178,955 | 1/1993 | Aharoni et al. | 428/421 |
| 5,225,244 | 7/1993 | Aharoni et al. | 427/240 |

FOREIGN PATENT DOCUMENTS

| 51-1387 | 1/1976 | Japan . |
| 52-26382 | 2/1977 | Japan . |
| 54-23557 | 2/1979 | Japan . |
| 56-86980 | 7/1981 | Japan . |
| 86980 | 7/1981 | Japan | 428/447 |
| 57-47330 | 3/1982 | Japan . |
| 58-172245 | 10/1983 | Japan . |
| 58-211701 | 12/1983 | Japan . |
| 59-13201 | 1/1984 | Japan . |
| 59-39714 | 3/1984 | Japan . |
| 59-231501 | 12/1984 | Japan . |
| 60-258190 | 12/1985 | Japan . |
| 61-130902 | 6/1986 | Japan . |
| 62-80603 | 4/1987 | Japan . |
| 62-148902 | 7/1987 | Japan . |
| 63-214701 | 9/1988 | Japan . |
| 63-228101 | 9/1988 | Japan . |
| 64-9222 | 1/1989 | Japan . |
| 1-86101 | 3/1989 | Japan . |
| 1-149808 | 6/1989 | Japan . |
| 1-200203 | 8/1989 | Japan . |
| 1-239501 | 9/1989 | Japan . |
| 1-309003 | 12/1989 | Japan . |
| 2-671 | 1/1990 | Japan . |
| 2-87101 | 3/1990 | Japan . |
| 2-130501 | 5/1990 | Japan . |
| 2-181701 | 7/1990 | Japan . |
| 2-197801 | 8/1990 | Japan . |
| 2-248480 | 10/1990 | Japan . |
| 3-148603 | 6/1991 | Japan . |
| 3-195757 | 8/1991 | Japan . |
| 3-266801 | 11/1991 | Japan . |
| 4-72055 | 3/1992 | Japan . |
| 1-257801 | 10/1996 | Japan . |

OTHER PUBLICATIONS

Chemical Abstracts, vol. 107, No. 18, 2 Nov. 1987, p. 121.
World Surface Coatings Abstracts, vol. 57, No. 499, p. 4, Jan. 1984.
"Seminar on Plastics (9) Silicon Resins," Nikkan Kogyo Shinbunsha, pp. 185–186 (Apr. 20, 1970).

*Primary Examiner*—Amy Hulina
*Attorney, Agent, or Firm*—Stroock & Stroock & Lavan

[57] ABSTRACT

An inorganic coating film having improved water repellency is provided. The improved surface is provided by treating an inorganic coating film with a material that is reached or adsorbed on the surface of the inorganic coat to increase water repellency. The inorganic coating to be treated may be a silicon dioxide film. The materials used to treat the film include: (1) halogenated silane compounds; (2) silane compounds having a structure including at least one bond selected from Si—H, Si—OH, Si—OR, Si—SH and Si—SR, wherein R is an organic group; (3) silane compounds having a structure including at least one of

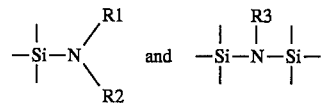

wherein R1, R2 and R3 are hydrogen or an organic group and (4) reactive organic compounds having a fluorine substituting group, hydrogen fluoride or a metal fluoride.

22 Claims, No Drawings

SYNTHETIC RESIN OPHTHALMIC LENS HAVING AN INORGANIC COATING

This is a continuation of application Ser. No. 08/020,181, filed Feb. 16, 1993 now abandoned, which is a continuation of application Ser. No. 07/759,990, filed Sep. 16, 1991 now abandoned, which is a continuation of Ser. No. 07/003,883, filed Jan. 16, 1987 now abandoned.

BACKGROUND OF THE INVENTION

The invention relates generally to inorganic coating films, and more particularly to an improved inorganic coating film for optical materials.

Inorganic coating films are prepared by various methods including vacuum vapor deposition, ion plating, sputtering and the like. Such films are widely used as anti-reflection films, hard coats and other functional coatings of optical materials such as lenses and display device panels. Silicon dioxide is used extensively as an inorganic coating film because it readily adheres to most base materials and is hard and each to handle.

One of the critical defects of prior art inorganic coating films occurs when a water drop appears on the surface of the coating and dries. A water spot appears on the inorganic film which is similar to a spot on optical glass. The water spot affects the appearance and optical properties of the coating. As used herein, the term "spot" refers to stain which appears on optical glass and the term "water spot" refers to stains that appear on inorganic coating films. In the case of ophthalmic lenses, water drops often form on the lens surface during the edging process and during use. If the water drops are left on the lens surface for even a short period of time, a water spot appears.

In general, spots on optical glass are the result of the following processes:

(1) Ions in the glass including $Na^+$, $Ba^{2+}$, $Pb^{2+}$ and the like are dissolved in the water drop and the water drop becomes an alkaline solution; and (2) The alkaline water drop solution reacts with acidic gasses in the atmosphere, such as $CO_2$ and $SO_2$ to form compounds of $Na_2CO_3$, $NaHCO_3$, $Na_2SO_4$, $BaCO_3$, $PbCO_3$, $BaSO_4$, $PbSO_4$ and the like. These compounds remain on the surface of the optical glass and cause the spot.

In contrast, inorganic coating films of $SiO_2$ formed on synthetic resin bases do not contain positive ions and the reason for the formation of water spots had not been known until recently. It has now been determined that water spots are caused by an evaporation residue primarily of silicon compounds. These are produced in the water drop on the surface of the coating and strongly adhere to the surface. This phenomenon was determined as follows:

(1) When ultra pure water drops are placed onto the surface of a coating film, water spots did not appear. In the case of optical glass, even ultra pure water causes spots;

(2) When a water spot did appear and a section was taken through a portion of the coating surface where the water spot had appeared and was observed by transmissive electronic microscope (TEM), deposits were seen on the surface; and (3) The elements of the deposits were analyzed and silicon was primarily detected.

Accordingly, it is desirable to provide an inorganic coating film that does not form water spots as a result of water droplets on the coating film.

SUMMARY OF THE INVENTION

Generally speaking, in accordance with the invention, an improved inorganic coating film for coating optical bases is provided. The improved coating film is provided by treating the surface of an inorganic coating film with a material to improve the water repellency of the coating film. The material may be reacted with the inorganic film or adsorbed onto the film. Suitable materials include (1) halogenated silane compounds, (2) silane compounds having a structure including at least one bond selected from Si—H, Si—OH, Si—OR, Si—SH and Si—SR wherein R is an organic group, (3) silane compounds having a structure including at least one of

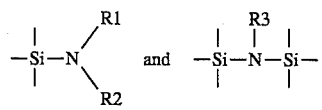

wherein R1, R2 and R3 are hydrogen or an organic group and (4) reactive organic compounds having a fluorine substituting group, hydrogen fluoride or a metal fluoride. Following treatment, the inorganic coating exhibits improved water repellency.

Accordingly, it is an object of the invention to provide an improved inorganic coating film.

Another object of the invention is to provide an inorganic coating film having improved water repellency.

Still another object of the invention is to react or adsorb a functional group on the surface of an inorganic coating film so as to prevent spotting by water droplets.

Still other objects and advantages of the invention will in part be obvious and will in part be apparent from the specification.

The invention accordingly comprises the several steps and the relation of one or more of such steps with respect to each of the other, and the article possessing the features, properties and the relation of elements, which are exemplified in the following detailed disclosure, and the scope of the invention will be indicated in the claims.

DETAILED DESCRIPTION OF THE PREFERRED EMBODIMENTS

Water spots on the surface of inorganic coating films are caused by elements in water drops that remain as evaporation residue and deposits on the surface. The elements of evaporation are primarily silicon compounds having a strong affinity for the inorganic coating film. Thus, the residues adhere strongly to the surface of the coating film. Accordingly, in order to prevent water spots from appearing, it is necessary to improve the surface of the inorganic coating film to reduce the adhesiveness between the coating surface and the evaporation residue.

Extensive investigation by the present inventors has shown that by improving water repellency of the surface of the inorganic coat, the strength of the adhesive forces between the evaporation residue and the surface of the inorganic coating film can be reduced. The adhesive force is reduced to such an extent that even if the residue remains on the surface, it can be wiped off with a cloth or the like. Furthermore, it has also been found that by improving water repellency on the surface, the water drop itself becomes unlikely to rest on the surface and the occurrence of water spots is reduced. In order to provide a satisfactory degree of water repellency, the contacting angle of pure water and the coating surface is preferably greater than about 70°.

Prior to treating the inorganic coating film to improve water repellency, care must be taken not to cause deterioration of the properties of the film including adhesiveness to the base and durability of the coating on the base. In particular, when an inorganic coating film on a synthetic resin base is to be treated, the inorganic coating film will crack and the appearance and durability of the coating will deteriorate significantly if the treatment temperature is too high. Therefore, it is necessary for the treatment layer be thin enough to avoid affecting pre-treatment properties including adhesiveness, durability and external view as well as spectral properties of the anti-reflection film. In addition, the treatment must be performed at a temperature and under conditions such that these properties do not deteriorate.

The materials to be reacted with or adsorbed on the surface of an inorganic coating film in accordance with the invention may be reacted or adsorbed over a wide treatment temperature range from room temperature to high temperatures.

Examples of compounds that can be used in accordance with the invention are:

(1) Halogenated silane compounds having a structure containing an Si—X linkage wherein X is halogen. Suitable halogenated silane compounds include:
trimethylchlorosilane
dimethyldichlorosilane
methyltrichlorosilane
chloromethyltrichlorosilane
methyldichlorosilane
1,2-dibromoethyltrichlorosilane
vinyltrichlorosilane
1,2-dichloroethyltrichlorosilane
1-chloroethyltrichlorosilane
2-chloroethyltrichlorosilane
chloromethylmethyldichlorosilane
ethyltrichlorosilane
ethyldichlorosilane
dimethylchlorosilane
3,3,3-trifluoropropyltrichlorosilane
2-cyanoethyltrichlorosilane
allyltrichlorosilane
3-bromopropyltrichlorosilane
methylvinyldichlorosilane
3-chloropropyltrichlorosilane
dichloromethyldimethylchlorosilane
n-propyltrichlorosilane
chloromethyldimethylchlorosilane
ethylmethyldichlorosilane
ethoxymethyldichlorosilane
dimethoxymethylchlorosilane
divinyldichlorosilane
3-cyanopropyltrichlorosilane
methyl-3,3,3-trifluoropropyldichlorosilane
allylmethyldichlorosilane
dimethylvinylchlorosilane
n-butyltrichlorosilane
3-chloropropylmethyldichlorosilane
isobutyltrichlorosilane
methylpropyldichlorosilane
diethoxydichlorosilane
3-cyanopropylmethyldichlorosilane
allyldimethylchlorosilane
pentyltrichlorosilane
3-chloropropyldimethylchlorosilane
butylmethyldichlorosilane
dimethylpropylchlorosilane
dimethylisopropylchlorosilane
3,3,4,4,5,5,6,6,6-nonafluorohexyltrichlorosilane
4-chlorophenyltrichlorosilane
phenyltrichlorosilane
phenoxytrichlorosilane
phenyldichlorosilane
diallyldichlorosilane
cyclohexyltrichlorosilane
3-cyanopropyldimethylchlorosilane
hexyltrichlorosilane
methylpentyldichlorosilane
tert-butyldimethylchlorosilane
triethylchlorosilane
3,3,4,4,5,5,6,6,6-nonafluorohexylmethyldichlorosilane
benzyltrichlorosilane
p-tolytrichlorosilane
methylphenyldichlorosilane
methylphenylchlorosilane
6-trichlorosilyl-2-norbornane
2-trichlorosilylnorbornane
cyclohexylmethyldichlorosilane
heptyltrichlorosilane
hexylmethyldichlorosilane
phenylvinyldichlorosilane
β-phenethyltrichlorosilane
dimethylphenylchlorosilane
2-(4-cyclohexenylethyl)trichlorosilane
2-methyldichlorosilylnorbornane
3-methacryloxypropylmethyldichlorosilane
octyltrichlorosilane
heptylmethyldichlorosilane
dibutyldichlorosilane
allylphenyldichlorosilane
chloromethylphenylethyltrichlorosilane
methylphenylvinylchlorosilane
3-chloropropylphenyldichlorosilane
2-phenylpropyltrichlorosilane
methyl-β-phenethyldichlorosilane
benzyldimethylchlorosilane
nonyltrichlorosilane
methyloctyldichlorosilane
tripropylchlorosilane
tert-butylphenyldichlorosilane
decyltrichlorosilane
dimethyloctylchlorosilane
decylmethyldichlorosilane
diphenyldichlorosilane
diphenyldifluorosilane
diphenylchlorosilane
dodecyltrichlorosilane
dihexyldichlorosilane
tributylchlorosilane
diphenylmethylchlorosilane
dodecylmethyldichlorosilane
diphenylvinylchlorosilane
tetradecyltrichlorosilane
triphenylchlorosilane
trihexylchlorosilane
methyloctadecyldichlorosilane
eicosyltrichlorosilane
dimethyloctadecylchlorosilane
tribenzylchlorosilane
docosyltrichlorosilane
docosylmethyldichlorosilane
1,2-bis(trichlorosilyl)ethane
1,2-bis(methyldichlorosilyl)ethane
1,1,3,3-tetramethyl-1,3-dichlorodisiloxane
1,2-bis(methylchlorosilyl)ethane 1,4-bis(dimethylchlorosilyl)benzene
1,3-dichlorotetraisopropyldisiloxane
1,1,3,3,5,5-hexamethyl-1,5-dichlorotrisiloxane
1,2-dichlorooctamethyltetrasiloxane (2) Silane compounds having a structure containing at least one of the following linkages, Si—H, Si—OH, Si—OR, Si—SH and Si—SR wherein R is an organic group. Suitable compounds include:
trimethylsilanol
dimethoxymethylsilane
trimethoxysilane
chloromethylmethoxydimethylsilane
chloromethyltrimethoxysilane
diethylsilane
dimethylethoxysilane
methoxytrimethylsilane
dimethoxydimethylsilane
diethoxysilane
methyltrimethoxysilane
mercaptomethyltrimethoxysilane
tetramethoxysilane
methylthiotrimethylsilane
dimethyldimethylaminosilane
trifluoroacetoxytrimethylsilane
diacetoxymethylsilane
allyldimethylsilane
3-chloroethoxychloromethyldimethylsilane
bis(2-chloroethoxy)methylsilane
trimethylvinyloxysilane
methoxydimethylvinylsilane
acetoxymethylsilane
2-chloroethoxymethylsilane
chloromethyldimethylethoxysilane
diethylmethylsilane
ethoxytrimethylsilane
diethoxymethylsilane
ethyltrimethoxysilane
bis(dimethylamino)methylsilane
phenylsilane
2-propynyloxytrimethylsilane
dimethylethoxyethynylsilane
diacetoxydimethylsilane
allyloxychloromethylsilane
tris(2-chloroethoxy)silane
dimethoxymethyl-3,3,3-trifluoropropylsilane
3,3,3-trifluoropropyltrimethoxysilane
2-cyanoethyltrimethoxysilane
allyltrimethylsilane
1-chloromethyl-2-chloroethoxytrimethylsilane
allyloxytrimethylsilane
ethoxymethylvinylsilane
isopropenoxytrimethylsilane
1-chloromethylethoxytrimethylsilane
3-chloropropoxytrimethylsilane
3-chloropropyldimethoxymethylsilane
chloromethyldiethoxymethylsilane
3-chloropropyltrimethoxysilane
dimethylketoximetrimethylsilane
triethylsilane
butyldimethylsilane
trimethylisopropoxysilane
triethylsilanol
diethoxydimethylsilane
dimethoxy-3-mercaptopropylmethylsilane
triethoxysilane
3-mercaptopropyltrimethoxysilane
diethylaminodimethylsilane
3-aminopropyltrimethoxysilane
2-aminoethylaminomethyltrimethoxysilane
tris(dimethylamino)silane
methylphenylsilane
diacetoxymethylvinylsilane
methyltriacetoxysilane
allyloxydimethylvinylsilane
1-chloromethylethoxydimethylvinylsilane
dimethylketoximedimethylvinylsilane
methylsilatrane
diethoxymethylvinylsilane
chloromethyltriethoxysilane
ethylmethylketoximetrimethylsilane
dimethoxyethylmethylketoximemethylsilane
tert-butoxytrimethylsilane
1-methylpropoxytrimethylsilane
butoxytrimethylsilane
butyltrimethoxysilane
methyltriethoxysilane
dimethylaminoxytrimethylsilane
3-aminopropyldimethylethoxysilane
methyltris(2-aminoethoxy)silane
dimethylphenylsilane
triacetoxyvinylsilane
tetraacetoxysilane
furfuryloxytrimethylsilane
ethyltriacetoxysilane
3-trifluoroacetoxypropyltrimethoxysilane
ethynyldimethyl-2-nitrobutoxysilane
1,1-dimethylpropynyloxytrimethylsilane
diethoxydivinylsilane
dimethylethylmethylketoximevinylsilane
dimethyl-2-nitrobutoxyvinylsilane
dimethylisobutoxyvinylsilane
acetoxytriethylsilane
tetrahydrofurfuryloxytrimethylsilane
triethoxyvinylsilane
oxtylsilane
allyloxy-2-aminoethylaminomethyldimethylsilane
trimethylpentyloxysilane
isopentyloxytrimethylsilane
diethoxydiethylsilane
dimethyldipropoxysilane
ethyltriethoxysilane
tetraethoxysilane
3-aminopropyldiethoxymethylsilane
3-(2-aminoethylaminopropyl)dimethoxymethylsilane
3-(2-aminoethylaminopropyl)trimethoxysilane
2,4,5-trichlorophenoxytrimethylsilane
methylphenylvinylsilane
chloromethyldimethyl-m-nitrophenylsilane
chloromethyldimethyl-p-nitrophenylsilane
2,4-dichlorophenoxytrimethylsilane
4-bromophenoxytrimethylsilane
chloromethyldimethylphenoxysilane
2-chlorophenoxytrimethylsilane
2-chlorophenoxytrimethoxysilane
4-chlorophenyltrimethoxysilane
4-chlorophenoxytrimethylsilane
phenoxytrimethylsilane
3-hydroxyphenoxytrimethylsilane
dimethoxymethylphenylsilane
dimethylfurfurylvinylsilane
2-hydroxyphenoxytrimethylsilane
phenyltrimethoxysilane
1-cyclohexenyloxytrimethylsilane
chloromethylcyclohexyloxidimethylsilane 2-cyanoethyltriethoxysilane
cyclohexyloxytrimethylsilane
dimethylisopentyloxyvinylsilane
allyltriethoxysilane
3-allylthiopropyltrimethoxysilane
3-glycidoxypropylitrimethoxysilane
3-bromopropyltriethoxysilane
chloromethyldimethyl-2-[(2-ethoxyethoxy)ethoxy]silane
3-chloropropyltriethoxysilane
3-allylaminopropyltrimethoxysilane
diethoxyethylmethylketoximemethylsilane
tripropylsilane
hexyloxytrimethylsilane
2-(2-ethoxyethoxy)ethoxytrimethylsilane
propyltriethoxysilane
hexyltrimethoxysilane
2-(2-aminomethylthioethyl)diethoxymethylsilane
3-aminopropyltriethoxysilane
O,O'-diethyl-S-(2-trimethylsilylethyl)dithiophosphate
2,4-dichlorophenoxyethynyldimethylsilane
trimethylsilylbenzoate
benzyloxychloromethyldimethylsilane
4-aminophenoxydimethylvinylsilane
dimethylethoxyphenylsilane
benzyloxytrimethylsilane
methyltrisisopropoxysilane
3-methacryloxypropyldimethyloxymethylsilane
3-methacryloxypropyltrimethoxysilane
3-(3-cyanopropylthiopropyl)dimethoxymethylsilane
bis(ethylmethylketoxime)methoxymethylsilane
dimethylethoxy-3-glycydoxypropylsilane
dimethyl-2-[(2-ethoxyethoxy)ethoxy]vinylsilane
dimethoxymethyl-2-piperidinoethylsilane
3-morpholinopropyltrimethoxysilane
dimethoxymethyl-3-piperazinopropylsilane
N-(3-triethoxysilylpropyl)urea
methoxytripropylsilane
dibutoxydimethylsilane
methyltripropoxysilane
methyltriisopropoxysilane
dimethoxy-3-(2-ethoxyethylthiopropyl)methylsilane
methyltris(2-methoxyethoxy)silane
3-dimethylaminopropyldiethoxymethylsilane
2-(2-aminoethylthioethyl)triethoxysilane
3-[2-(2-aminoethylaminoethylamino)propyl]trimethoxysilane
dimethylethynyl-2-nitro-4-methylphenoxysilane
diacetoxymethylphenylsilane
dimethyl-3-methyl-4-chlorophenoxyvinylsilane
dimethyl-2-methyl-4-chlorophenoxyvinylsilane
chloromethyldimethyl-2-phenylethoxysilane
benzyldimethylethoxysilane
diethoxymethylphenylsilane
tris(1-methylvinyloxy)vinylsilane
2-(3,4-epoxycyclohexylethyl)trimethoxysilane
dimethyl-2-piperidinoethoxyvinylsilane
bis(ethylmethylketoxime)ethoxymethylsilane
trisisopropoxyvinylsilane
diethoxy-3-glycidoxypropylmethylsilane
3-(3-(acetoxypropylthio)propyldimethoxymethylsilane
tris(2-methoxyethoxy)vinylsilane
dimethoxymethyl-3-piperidinopropylsilane
dipropoxyethylmethylketoximemethylsilane
diisopropoxyethylmethylketoximemethylsilane
3-piperidinopropyltrimethoxysilane
2-ethylhexyloxymethylsilane
octyloxytrimethylsilane
pentyltriethoxysilane
diethyl 2-(2-trimethylsilylethylthioethyl)phosphite
diphenylsilanediol
phenylsilatrane
4-chlorophenyltriethoxysilane
phenyltriethoxysilane
tetraallyloxysilane
3-phenylaminopropyltrimethoxysilane
2-aminoethylaminomethylbenzyloxydimethylsilane
N-(3-diethoxymethylsilylpropyl)succinimide
bis(ethylmethylketoxime)methylpropoxysilane
bis(ethylmethylketoxime)methylisopropoxysilane
bis(ethylketoxime)-2-methoxyethoxymethylsilane
dimethoxymethyl-3-(4-methylpiperidinopropyl)silane
3-(2-methylpiperidinopropyl)trimethoxysilane
3-cyclohexylaminopropyltrimethoxysilane
tetrapropoxysilane
tetraisopropoxysilane
tetrakis(2-methoxyethoxy)silane
O,O'-diethyl-S-(2-triethoxysilylethyl)dithiophosphate
diphenylmethylsilane
triethylsilylbenzoate
benzyltriethoxysilane
6-triethoxysilyl-2-norbornane
diethoxy-2-piperidinoethoxyvinylsilane
3-benzylaminopropyltrimethoxysilane
methyltris(ethylketoxime)silane
bis(ethylmethylketoxime)butoxymethylsilane
dibutoxymethylethylmethylketoximesilane
methyltris(N,N-diethylaminoxy)silane
dimethoxydiphenylsilane
benzylidene-3-ethoxydimethylsilylpropylamine
octyltriethoxysilane
diphenylethoxymethylsilane
dimethoxyphenyl-2-piperidinoethoxysilane
phenyltris(2-methoxyethoxy)silane
3-(vinylbenzylaminopropyl)trimethoxysilane
dodecyloxytrimethylsilane
triphenyloxysilane
diacetoxydiphenylsilane
diphenylethoxyvinylsilane
diethoxydiphenylsilane
N-(3-triethoxysilylpropyl)-p-nitrobenzamide
tetrabutoxysilane
bis(1,1-dimethyl-2-propynyloxy)methylphenylsilane
diethoxydodecylmethylsilane
triphenylsilane
triphenylsilanol
3-(vinylbenzylaminopropyl)triethoxysilane
trihexylsilane
dodecyltriethoxysilane
acetoxytriphenylsilane
ethoxytriphenylsilane
diphenylmethyl-2-piperidinoethoxysilane
diphenylmethoxy-2-piperidinoethoxysilane
diethoxymethyloctadecylsilane
tetraphenoxysilane
octadeciltriethoxysilane
tetrakis(2-ethylbutoxy)silane
dimethyloctadecyl-3-trimethoxysilylpropylammoniumchloride
tetrakis(2-ethylhexyloxy)silane
1,1,3,3-tetramethyldisiloxane
pentamethyldisiloxane
1,3-dimethoxymethyldisiloxane
N,O-bis(trimethylsilyl)trifluoroacetoamide
N,O-bis(trimethylsilyl)acetoamine 1,3-diethoxytetramethyldisiloxane
bis(trimethylsilyl)-6-azauracil
1,4-bis(dimethylsilyl)benzene
1,4-(hydroxidimethylsilyl)benzene
bis(trimethylsilyl)uracil
bis(trimethylsilyl)cytosine
O,O'-bis(trimethylsilyl)diacetyldioxime
N,O-bis(trimethylsilyl)hypoxanthene
O,O'-bis(trimethylsilyl)timine
4-trimethylsiloxyphenyltrimethylsilane
1,2 or 1,3 or 1,4-bis(trimethylsiloxy)benzene
bis(trimethylsilyl)adipate
trimethylsilyl-2-trimethylsilylthiobenzoate
1,1,3,3,5,5-hexamethyltrisiloxane
1,1,1,3,5,5,5-heptamethyltrisiloxane
octamethyltrisiloxane
3-ethoxyheptamethyltrisiloxane
1,3,5,7-tetramethylcyclotetrasiloxane
1,1,1,3,5,7,7-octamethyltetrasiloxane
tris(trimethylsiloxy)silane
1,7-diacetoxyoctamethyltetrasiloxane
1,3,5,7-tetraethoxy-1,3,5,7-tetramethylcyclotetrasiloxane
1,3,5,7-tetramethyl-1,3,5,7-tetrapropoxy-cyclotetrasiloxane
1,3,5,7-tetraisopropoxy-1,3,5,7-tetramethylcyclotetrasiloxane
2-piperidenoethoxytris(trimethylsiloxy)silane
1,3-bis(3-trimethylsiloxypropyl)-1,1,3,3-tetramethyldisiloxane
1,3,5,7-tetrabutoxy-1,3,5,7-tetramethylcyclotetrasiloxane
tetrakis(dimethylvinylsiloxymethyl)methane
1,3,5,7,9-pentamethylcyclopentasiloxane
1,3,5,7,9-pentamethoxy-1,3,5,7,9-pentamethylcyclopentasiloxane
1,3,5,7,9-pentaisobutoxy-1,3,5,7,9-pentamethylcyclopentasiloxane (3) Silane compounds having a structure including at least one of

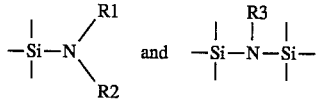

wherein R1, R2 and R3 are hydrogen or an organic group. Such Si—N or Si—N—Si compounds include:
dimethyldimethylaminosilane
1-trimethylsilyl-1,2,4-triazole
2-trimethylsilyl-1,2,3-triazole
N-trimethylsilylacetoamide
dimethylaminotrimethylsilane
bis(dimethylamino)methylsilane
1-trimethylsilylimidazole
allylaminotrimethylsilane
N-methyl-N-trimethylsilylacetoamide
diethylaminodimethylsilane
bis(ethylamino)dimethylsilane
bis(dimethylamino)dimethylsilane
tris(dimethylamino)silane
1-trimethylsilylpyrole
1-trimethylsilylpyrrolydiene
bis(dismethylamino)methylvinylsilane
diethylaminotrimethylsilane
methyltris(dimethylamino)silane
piperidinotrimethylsilane
anilinotrimethylsilane
bis(diethylamino)dimethylsilane
bis(butylamino)dimethylsilane
phenyltris(dimethylamino)silane
dipiperidinomethylvinylsilane
N-N'-diphenyl-N-trimethylsilylurea
bis(dimethylamino)diphenylsilane
methyltripiperidinosilane
tetrakis(diethylamino)silane
dipiperidinomethyl-2-piperdinoethylsilane
methyltris(cyclohexylamino)silane
dianilinodiphenylsilane
1,1,3,3-tetramethyldisilazane
1,3-bis(chloromethyl)-1,1,3,3-tetramethyldisilazane
hexamethyldisilazane
heptamethyldisilazane
1,3-divinyl-1,1,3,3-tetramethyldisilazane
tris(trimethylsilyl)amine
1,1,3,3,5,5,7,7-octamethylcyclotetrasilazane and

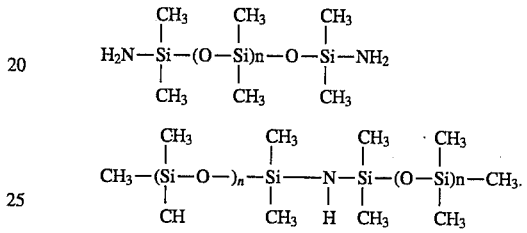

(4) Reactive organic compounds having fluorine substituting groups, hydrogen fluoride or metal fluoride. The organic compounds including fluorine substituting groups include:

(i) acyl halides represented by the formula:

wherein Rf is the organic group partially substituted by fluorine and X is halogen (ii) ammonium salts represented by the formula:

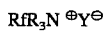

wherein Rf is the organic group partially substituted by fluorine, R is alkyl group having carbon atoms of 1 to 3, and $Y^{\ominus}$ is anion such as halogen ion, sulfate ion and carboxylic acid ion (iii) isocyanate esters represented by Rf—N=C=O and thioisocyanate esters represented by Rf—N=C=S wherein Rf is the organic group partially substituted by fluorine.

The typical examples of Rf are those represented by the formulae [I], [II] and [III]

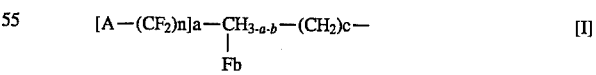

wherein A is fluorine atom or hydrogen atom, n is an integer from 1 to 18, a is 1 or 2, b is 0 or 1 and c is an integer from 0 to 2

wherein m is an integer from 0 to 17, d is an integer from 0 to 5 and R' is alkyl group having carbon atoms from 1 to 5

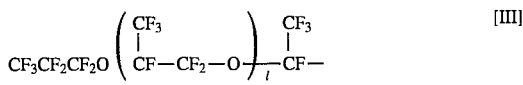

wherein l is an integer from 0 to 5 metal fluoride such as NaF, NaHF$_2$, CaF$_2$, AlF$_3$, ZnF$_2$, SbF$_3$, SbF$_5$, CrF$_2$, CrF$_3$, KF, CoF$_2$, CoF$_3$, MgF$_2$, TlF, FeF$_2$, FeF$_3$, NiF$_2$ and BaF$_2$ Materials that are useful in accordance with the invention are not limited to those listed above, but include any material that when reacted with or adsorbed onto the surface of an organic coating film improves the water repellency of the coating film.

The listed materials are reacted or adsorbed onto the surface of inorganic coating films having strong polarity as follows:

(1) When a hydroxyl group is subjected to a halogenated silane compound, hydrohalide is eliminated. This reaction is:

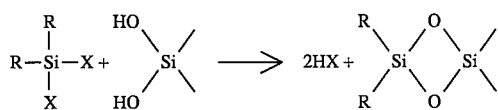

The resulting halogenated silane compound is extremely stable and very effective for improving the water repellency of surfaces which include hydroxyl groups.

(2) When a silane compound having a structure including at least one of Si—H, Si—OH, Si—OR, Si—SH or Si—SR linkages is applied to the surface of an inorganic coating film having a hydroxyl group, dehydration, dealcoholation, dehydrogenation and the like take place. Accordingly, these silane compounds are effective for surfaces on which hydroxyl groups exist. For example, in the vicinity of the surface of an SiO$_2$ film, the following reactions are believed to occur:

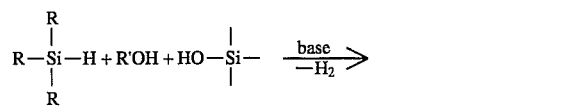

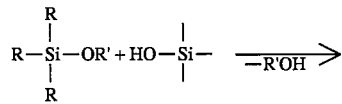

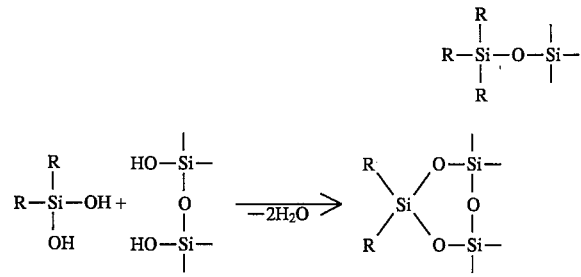

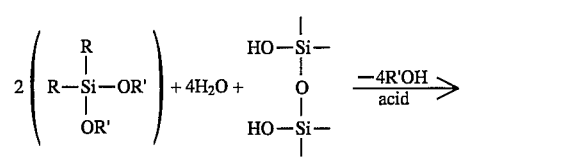

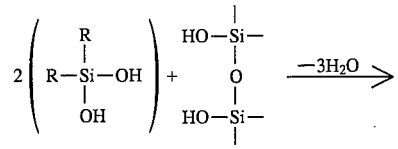

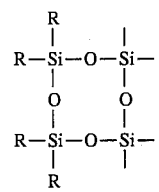

wherein R and R' are arbitrary substituent groups.

(3) When silane compounds containing a Si—N or Si—N—Si linkage are used, the following reactions are believed to occur:

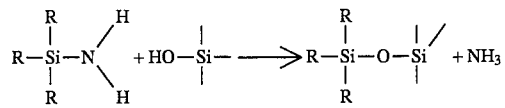

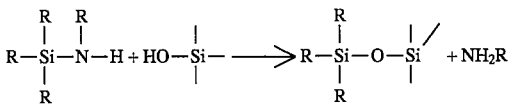

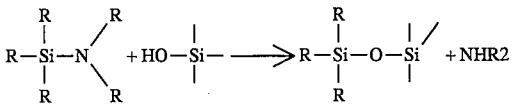

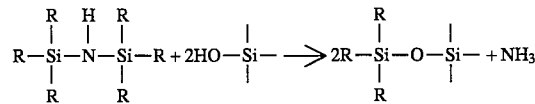

wherein R is an arbitrary substituent group.

Alternatively, the nitrogen containing compound may be heavily adsorbed.

(4) Other reactions include the following:

(a) carboxylic acid halide

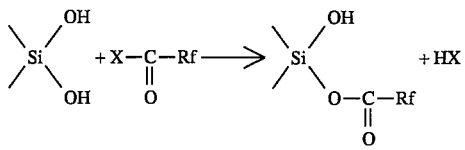

(b) ammonium salt

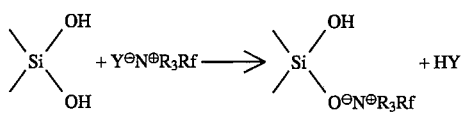

(c) isocyanate ester and thioisocyanate ester

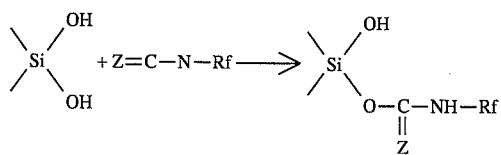

wherein Z is O or S (d) hydrogen fluoride and metal fluoride
(This is more effective when used in combination with conc sulfuric acid.)

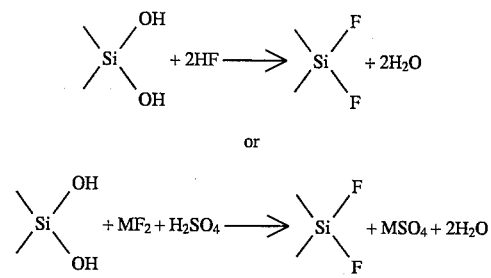

wherein M is metal

In order to react or adsorb the silane organic fluorine compounds described onto the surface of an inorganic coating film, two different methods are used. One method requires coating the compound by dipping, spinning, spraying and the like in order to react or adsorb the compound onto the surface of the inorganic coating film. The second method requires reaction or adsorption directly onto the surface in a gaseous state in vacuum or inert atmosphere.

When coating the compound by dipping, spinning, spraying and the like, it is important to control environmental conditions including humidity and temperature. In addition, reaction speed is controlled, dipping time is adjusted, and solution temperature and density of the silane compound are regulated. Accordingly, the desired processed film can be obtained. The reaction can be accelerated by heating or exposure to light, although this must be done while taking care not to affect the properties of the inorganic coating film.

When a silane compound is reacted or absorbed in a gaseous state, the inorganic coating film is formed in a vacuum chamber and then the gaseous silane compound is introduced into the chamber to carry out the reaction. Alternatively, after forming the inorganic coating film, the gaseous silane compound can be introduced into a plasma atmosphere such as argon or oxygen and reactive vapor deposition, reactive ion plating and the like can be performed.

In order to enhance the reactivity of the surface of the inorganic coating film with the silane compound, pre-treatment of the surface by washing, chemical treatment or plasma treatment may be desirable. It should also be noted that the silane compound to be reacted can be used alone or in combination with other silane compounds. In addition, silane compounds that have been diluted with suitable solvents or pre-treated with acid or base are also acceptable. When the reaction has been completed, the silane compound that has not been reacted with water in the atmosphere and that has not contributed to the reaction with the surface of the coating film is washed away, thereby maintaining the anti-reflection properties, external appearance and the like of the inorganic coating film.

In order to react hydrogen fluoride onto an inorganic coating film gaseous hydrogen fluoride is reacted directly with the surface in vacuum or inert atmosphere. The surface is then dipped in hydrofluoric acid or in a mixture solution of hydrofluoric acid and concentrated sulfuric acid.

In order to react metal fluoride with the inorganic film surface, the pulverized metal fluoride is added to concentrated sulfuric acid and the article having the inorganic coating film is dipped into the acid solution. Since both hydrogen fluoride and metal fluoride are extremely reactive, the reaction may cause etching of the coating film and deterioration of the properties of the coating film. Accordingly, when hydrogen fluoride or metal fluoride are used, the reaction time should be short.

As noted above, inorganic coating films such as $SiO_2$ films with exposed hydroxyl groups have relatively strong polarity on the surface. These hydroxyl groups are likely to adsorb impurities in water drops and cause a water spot to form on the coating surface. In order to prevent this water spot from appearing, the inventors propose to treat the surface of the inorganic coating film with a less polar group to improve water repellency of the inorganic coating.

The invention will be better understood with reference to the following examples. These examples are presented for purposes of illustration only and are not to be construed in a limiting sense.

EXAMPLE 1

A synthetic resin lens made from diethyleneglycolbis(allylcarbonate) was washed with acetone and an anti-reflection treatment was prepared on the surface of the lens at a substrate temperature of 50° C. by vacuum vapor deposition. The film consisted of, in order from the surface of the lens, a $SiO_2$ layer having a thickness of $\lambda/4$, a $ZrO_2$ layer and $SiO_2$ layer having a thickness of $\lambda/4$ in total, a $ZrO_2$ layer having a thickness of $\lambda/4$ an dan uppermost layer of $SiO_2$ layer having a thickness of $\lambda/4$ where $\lambda$ was equal to 520 nm.

The lens was washed with isopropyl alcohol, dried and dipped into a 98% solution of dimethyldichlorosilane at a solution temperature of 15° C. for one minute. After dipping, the lens was pulled up at a speed of 1 cm per second into an atmosphere of 60% relative humidity and 25° C. The lens was maintained in the atmosphere for 30 minutes and then washed with trichloroethylene.

No change was observed in the external appearance and the anti-reflection properties of the lens after the final washing.

EXAMPLE 2

Aluminum oxide having a refractive index of 1.60 was deposited in argon plasma on the surface of a lens made of crown glass to a thickness of 1 micron using an ion plating method. The resulting lens was washed with pure water and dried. Then the lens was dipped into a diethyldichlorosilane solution that had been diluted with methylene chloride to 10% for about 1 minute. The lens was pulled up at a speed of 10 cm per second into an atmosphere of 80% relative humidity at 25° C. The lens was washed with methylene chloride.

The external appearance of the lens after washing exhibited no change from the external appearance prior to treatment.

EXAMPLE 3

As in Example 1, an anti-reflection film was formed on the surface of the uppermost $SiO_2$ layer and was treated with argon gas plasma for 1 minute. Then methyl-3,3,3-trifluoropropyldichlorosilane was introduced into the vacuum chamber at a rate of 5 cc per minute for 2 minutes. The temperature of the surface of the lens was 55° C. The lens was placed into the atmosphere and washed with tetrahydrofuran.

Little change was seen in the external appearance of the lens after washing.

EXAMPLE 4

As in Example 1, an anti-reflection film was formed on the surface of a synthetic resin lens and the lens was placed into a vacuum chamber. A mixture gas of argon and water in a ratio of 100 parts argon to 5 parts water was introduced into the chamber until the pressure was 0.1 Torr and the atmosphere was converted to a plasma using a high frequency electric field of 13.56 MHz. The lens was treated in the atmosphere for 30 seconds at a plasma output of 300 W.

The lens was removed from the vacuum chamber and 1,7-dichlorooctamethyltetrasiloxane was coated over the surface of the lens. Then the lens was washed with 1,1,2-trichloro-1,2,2-trifluoroethane.

No change was observed in the external appearance of the lens after washing.

EXAMPLE 5

A lens made of diethyleneglycolbis(allylcarbonate) that had been washed with isopropyl alcohol was treated with a 5% aqueous solution of sodium hydroxide at room temperature for 5 minutes. A coating solution was prepared as follows: 206 g of ethanol, 396 g of ethanol dispersed colloidal silica ("Oscal 1232" having a solids content of 30% manufactured by Catalysts & Chemicals Ind. Co., Ltd.), 312 g of a partially hydrolyzed compound of γ glycidoxypropyltrimethoxysilane, 0.2 g of a flow controlling agent ("L-7604" manufactured by Nippon Unicar Kabushiki Kaisha) and 8.6 g of a 0.05N aqueous solution of acetic acid were placed into a reaction container equipped with stirring equipment and stirred for 3 hours at room temperature. The coating solution was coated on the surface of the lens by a dipping method at a solution temperature of 5° C. and a removal speed of 40 cm per minute. The lens was heated and cured in a hot air dryer at 80° C. for 30 minutes and at 130° C. for 2 hours.

The anti-reflection treatment was the same as that in Example 1. The lens was treated with dimethyldichlorosilane as described in Example 1.

No change was observed in the external appearance of the lens after washing.

EXAMPLE 6

A lens having the anti-reflection film of Example 1 before treatment with dimethyldichlorosilane was washed with isopropyl alcohol and dried. The lens was dipped into a mixture solution of 50 g of dimethyldiethoxysilane, 450 g of isopropyl alcohol and 20 g of 0.05N chloric acid at a solution temperature of 10° C. for 3 minutes. After dipping, the lens was maintained in an atmosphere of 75% relative humidity and 50° C. for 15 minutes and washed with acetone.

No significant changes were observed in the external appearance and anti-reflection properties of the lens after washing.

EXAMPLE 7

A lens was prepared as described in Example 1. However, instead of using silane, the lens was treated as follows:

The lens was dipped into a mixture solution of 100 g of diphenylsilane and 300 g of tetrahydrofuran at a solution temperature of 20° C. for 30 seconds. The lens was maintained in diethylamine vapor for 1 minute and washed with water.

EXAMPLE 8

A glass lens was prepared by the processes described in Example 2 prior to treatment with silane. The glass lens was dipped into a mixture solution of 10 g of 1,1,3,3,5,5-hexamethyltrisiloxane, 5 g of ethyl alcohol and 200 g of N,N-dimethylformamide at a solution temperature of 10° C. for 1 minute and maintained in an atmosphere of 80% relative humidity and 60° C. for 5 minutes. The lens was washed with acetone.

EXAMPLE 9

A lens was prepared as described in Example 1 and after forming the uppermost $SiO_2$ layer, the surface of the $SiO_2$ layer was treated with argon plasma for 1 minute. Trimethylsilanol was introduced into the vacuum chamber at a rate of 5 cc per minute for 2 minutes. The surface temperature at this time was 60° C. The lens was removed from the chamber into the atmosphere.

Almost no change was observed in the external appearance of the lens after treatment.

EXAMPLE 10

An acrylic plate was washed with isopropyl alcohol and coated as follows:

200 g of ethanol, 180 g of ethanol dispersed colloidal silica ("Oscal 1232" manufactured by Catalysts & Chemicals Ind. Co., Ltd.), 45 g of γ-methacryloxypropyltrimethoxysilane, 30 g of γ-glycidoxypropyltrimethoxysilane, 0.5 g of a flow control agent and 40 g of 0.05N nitric acid were placed into a reaction capacitor equipped with stirring equipment and stirred at room temperature for 2 hours to yield the coating solution.

The coating solution was coated by the dipping method at a solution temperature of 5° C. and a removal speed of 20 cm per minute. The plate was heated and cured using a hot air dryer at 70° C. for 5 hours and then subjected to light radiation of a germicidal lamp ("GL-10" manufactured by Tokyo Shibaura Denki Kabushiki Kaisha) with a distance between the lamp and the acryl plate being 10 cm for a period of 30 seconds.

Anti-reflection treatment was performed on the acryl plate as described in Example 1.

The plate was then dipped into a mixture of 15 g of dimethoxymethyl-3,3,3-trifluoropropylsilane, 5 g of 3,3,3-trifluoropropyltrimethoxysilane, 240 g of methyl cellosolve and 10 g of 0.05N hydrochloric acid at a solution temperature of 10° C. for 2 minutes. The plate was maintained in an atmosphere of 70% relative humidity and 40° C. for 10 minutes. The lens was washed with water.

No remarkable change was observed in the external appearance of the lens after washing.

EXAMPLE 11

A lens was prepared as described in Example 1 prior to treatment with silane. The lens was washed with isopropyl alcohol and dried. Then the lens was dipped into bis(dimethylamino)methylsilane solution at a solution temperature of 20° C. for 5 minutes.

After dipping, the lens was maintained in an atmosphere of 50% relative humidity at 25° C. for 10 minutes and then washed with acetone.

No remarkable change was observed in the external appearance and anti-reflection properties of the lens.

EXAMPLE 12

A lens was prepared as described in Example 1 prior to treatment with silane. The lens was treated by dipping into a hexamethyldisilazane solution for 10 minutes and maintained in atmosphere at a temperature of 50° C. for 30 minutes. The lens was washed with acetone.

EXAMPLE 13

A lens of crown glass was prepared as described in Example 2 prior to treatment with silane. The lens was washed with isopropyl alcohol. Then the lens was dipped into 1,1,3,3,5,5,7,7-octamethylcyclotetrasilazane solution that had been diluted to 30% with 1,1,2-trichloro-1,2,2-trifluoroethane for 10 minutes. The lens was maintained in an atmosphere of 40% relative humidity at 150° C. for 1 hour and washed with 1,1,2-trichloro-1,2,2-trifluoroethane.

No change was observed in the external appearance of the lens after washing.

EXAMPLE 14

A lens was prepared as described in Example 1 except that the uppermost $SiO_2$ layer was formed as follows:

$SiO_2$ was melted using an electron gun while a mixture gas of alcohol and methylaminotrimethylsilane was introduced into a vacuum chamber at a ratio of 9 parts alcohol to 1 part methylaminotrimethylsilane until the pressure of the chamber became 0.01 Torr. Then the atmosphere in the chamber was made into a plasma by applying a high frequency electric field of 13.56 MHz. A voltage of 300 V was applied to the base plate and the $SiO_2$ layer was formed by reactive ion plating at a high frequency output of 300 W.

EXAMPLE 15

A lens was prepared as described in Example 5 prior to treatment with silane and was dipped into a bis(diethylamino)dimethylsilane solution at room temperature for 30 minutes. Then the lens was maintained in an atmosphere of 40% relative humidity and 50° C. for 1 hour and washed with tetrahydrofuran.

Almost no change was observed in the external appearance of the lens after washing.

EXAMPLE 16

A lens was prepared as described in Example 1 prior to treatment with silane and was washed with isopropyl alcohol and dried. The lens was dipped into a 5% hexane solution of 3,3,4,4,5,5,5-heptafluoropentylisocyanate that had been dehydrated at 10° C. for 30 seconds. The lens was maintained in dry air at 30° C. for 1 minute and was dipped into isopropyl alcohol. The unreacted isocyanate was washed away. The lens was dried by evaporation drying of the isopropyl alcohol.

No remarkable change was observed in the external appearance and anti-reflection properties of the lens after washing and drying.

EXAMPLE 17

A lens was prepared as described in Example 2 prior to treatment with silane, washed with ethyl alcohol and dipped into a tetrahydrofuran solution of 10% 3,3,4,4,5,5,6,6-nonafluorohexyltrimethylammonium iodide at 25° C. for 1 minute. The lens was removed and maintained in dry air at 60° C. for 10 minutes. Then the lens was washed with pure water and dried.

Almost no change was observed in the external appearance of the lens after treatment.

EXAMPLE 18

A lens was prepared by the processes described in Example 1 and after the uppermost $SiO_2$ layer was formed the surface was treated with argon gas plasma for 1 minute. The lens was immediately dipped into THF solution containing perfluoro(2-methyl-3-oxyhexanoylfluoride) at a concentration of 10% at 50° C. for 2 minutes. The lens was drawn up, washed with THF and pure water and dried.

No change was observed in the external appearance of the lens.

EXAMPLE 19

A lens was prepared as described in Example 5 prior to treatment with silane and was dipped into a 96% concentrated sulfuric acid solution containing 20% of 250 to 300 mesh $CaF_2$ at 35° C. for 3 seconds. The lens was washed with water, an aqueous solution of saturated $NaHCO_3$ and pure water and dried.

Almost no change was observed in the external appearance of the lens.

EXAMPLE 20

A lens was prepared as described in Example 1 and after the uppermost $SiO_2$ layer was formed, the lens was dipped into a 15% hydrofluoric acid solution at 10° C. for 5 seconds. The lens was washed with water, an aqueous solution of saturated $NaHCO_2$ and pure water and dried.

Almost no change was observed in the external appearance of the lens.

CONTROL EXAMPLE 1

A synthetic resin lens having an anti-reflection film prepared by the processes described in Example 1 prior to treatment with the silane compound is referred to Control Example 1.

CONTROL EXAMPLE 2

Glass having an aluminum oxide film prepared by the processes described in Example 2 prior to treatment with the silane compound is referred to as Control Example 2.

CONTROL EXAMPLE 3

An acrylic plate having an anti-reflection film prepared by the processes described in Example 10 prior to treatment with the silane compound is referred to as Control Example 3.

The quality of the coatings obtained on each of the lenses was assessed by the following method:

(1) The ease of appearance of a water spot were observed by dropping service water onto the surface of the coating film and drying the water. The residue was wiped off with a cloth. The results are classified into A-residue completely wiped off; B-residue partially remained and C-residue remained;

(2) The contact angle between the water drop and the surface was measured using a contact angle measuring device such as the CA-D type manufactured by Kyowa Kagaku Kabushiki Kaisha using the dropping method for pure water. The results of the assessment of the properties are shown in Table 1.

TABLE 1

|  |  | water spot | contact angle |
|---|---|---|---|
| Embodiment Example | 1 | A | 90° |
|  | 2 | B | 95° |
|  | 3 | A | 120° |
|  | 4 | A | 112° |
|  | 5 | A | 90° |
|  | 6 | A | 91° |
|  | 7 | A | 98° |
|  | 8 | A | 102° |
|  | 9 | A | 89° |
|  | 10 | A | 119° |
|  | 11 | A | 95° |
|  | 12 | A | 100° |
|  | 13 | A | 92° |
|  | 14 | A | 94° |
|  | 15 | A | 103° |
|  | 16 | A | 92° |
|  | 17 | A | 90° |
|  | 18 | A | 132° |
|  | 19 | B | 89° |
|  | 20 | B | 91° |
| Control Example | 1 | C | 17° |
|  | 2 | B | 19° |
|  | 3 | C | 23° |

By providing improved water repellency on the surface of an inorganic coating in accordance with the invention, the surface energy is reduced. This reduces the affinity between water and the surface and also between impurities in the water and the surface, thereby preventing water spots from appearing. Furthermore, in association with the reduction of the surface energy, smears caused by organic materials such as sweat and fat from the human body and edible oil are easily cleaned with tissue paper and the like.

Improving the surface of the inorganic coating film in accordance with the invention can be applied to articles having an inorganic coat including lenses of synthetic resin and glass, optical glass for precision machines, display panels, cover glasses for timepieces, window glass and the like. It is anticipated that the invention may be applied to many other fields as well.

It will thus be seen that the objects set forth above, among those made apparent from the preceding description, are efficiently attained and, since certain changes may be made in carrying out the above method and in the article set forth without departing from the spirit and scope of the invention, it is intended that all matter contained in the above description shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A method for making a synthetic resin opthalmic lens having an $SiO_2$ antireflective coating film resistant to spots caused by water, comprising coating a synthetic resin ophthalmic lens substrate with an antireflective coating of $SiO_2$ and treating the surface of the $SiO_2$ coating film at a temperature from 10° to 60° C. with at least a compound which reacts with or is adsorbed onto the surface of the coating to improve the water repellency of the treated film, the compound selected from the group consisting of:

(1) halogenated silane compounds;
   (2) silane compounds having a linkage selected from the group of Si-SH and Si-SR wherein R is an organic group; and
   (3) silane compounds having an Si-N linkage in the form of

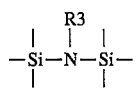

wherein R3 is hydrogen or an organic group; and
   (4) organic compounds having fluorine substituting groups selected from
      (i) acyl halides represented by the formula:

wherein Rf is an organic group partially substituted by fluorine and X is halogen;
      (ii) ammonium salt represented by the formula:

wherein Rf is an organic group partially substituted by fluorine, R is an alkyl group having 1 to 3 carbon atoms, and $Y^-$ is anion selected from the group consisting of halogen ion, sulfate ion and carboxylic acid ion;
      (iii) isocyanate esters represented by Rf—N=C=O and thioisocyanate esters represented by Rf—N=C=S wherein Rf is an organic group partially substituted by fluorine;
      (iv) hydrogen fluoride; and
      (v) metal fluorides.

2. The method of claim 1, wherein the surface of the $SiO_2$ coating film is treated with the compound by dipping the film into a solution containing the compound.

3. The method of claim 1, wherein the surface of the $SiO_2$ coating film is treated with the compound by spinning.

4. The method of claim 1, wherein the surface of the $SiO_2$ coating film is treated with the compound by spraying the compound onto the surface of the $SiO_2$ coating film.

5. The method of claim 1, wherein the surface of the $SiO_2$ coating film is treated by applying the compound directly onto the surface of the $SiO_2$ coating film in a gaseous state.

6. The method of claim 1, wherein the $SiO_2$ coating film is treated in a vacuum.

7. The method of claim 1, wherein the $SiO_2$ coating film is treated in an inert atmosphere.

8. The method of claim 1, wherein the compound for treating the surface of the $SiO_2$ coating film is a halogenated silane compound.

9. The method of claim 1, wherein the compound for treating the surface of the SiO$_2$ coating film is a silane compound having a Si-SH linkage.

10. The method of claim 1, wherein the compound for treating the surface of the SiO$_2$ coating film is a silane compound having a Si-SR linkage, wherein R is an organic group.

11. The method of claim 1, wherein the compound for treating the surface of the SiO$_2$ coating film is a silane compound having a Si-N linkage in the form of $$-\underset{|}{\mathrm{Si}}-\underset{|}{\overset{R3}{\mathrm{N}}}-\underset{|}{\mathrm{Si}}-$$

wherein R3 is a hydrogen or an organic group.

12. The method of claim 1, wherein the compound for treating the surface of the SiO$_2$ coating film is selected from the group consisting of:
(i) acyl halides represented by the formula:

$$\mathrm{Rf}-\underset{\underset{O}{\|}}{\mathrm{C}}-\mathrm{X}$$

wherein Rf is an organic group partially substituted by fluorine and X is halogen;
(ii) ammonium salt represented by the formula:

$$\mathrm{RfR_3N^+Y^-}$$

wherein Rf is an organic group partially substituted by fluorine and R is an alkyl group having 1 to 3 carbon atoms and Y$^-$ is an anion selected from the group consisting of halogen ions, sulfate ions and carboxylic acid ions;
(iii) isocyanate esters represented by Rf—N=C=O and thioisocyanate esters represented by Rf—N=C=S wherein Rf is an organic group partially substituted by fluorine;
(iv) hydrogen fluoride; and
(v) metal fluorides.

13. The method of claim 1, wherein the compound is selected from the group consisting of $$(\mathrm{A}-(\mathrm{CF}_2)\mathrm{n})\mathrm{a}-\mathrm{CH}_3-\mathrm{a}-\mathrm{b}-(\mathrm{CH}_2)\mathrm{c}- \quad (\mathrm{I})$$
$$|$$
$$\mathrm{Fb}$$

wherein A is fluorine atom or hydrogen atom, n is an integer from 1 to 18, a is 1 or 2, b is 0 or 1 and c is an integer from 0 to 2

$$\underset{|}{\overset{R'}{\mathrm{CF}_3(\mathrm{CF}_2)\mathrm{mSO}_2\mathrm{N}(\mathrm{CH}_2)\mathrm{d}-}} \quad (\mathrm{II})$$

wherein m is an integer from 0 to 17, d is an integer from 0 to 5 and R' is alkyl group having 1 to 5 carbon atoms.

$$\underset{|}{\overset{(\mathrm{CF}_3)}{\mathrm{CF}_3\mathrm{CF}_2\mathrm{CF}_2\mathrm{O}(\mathrm{CF}}}-\underset{|}{\overset{\mathrm{CF}_3}{\mathrm{CF}_2-\mathrm{O})_1}}-\mathrm{CF}- \quad (\mathrm{III})$$

wherein l is an integer from 0 to 5.

14. An improved synthetic resin opthalmic lens having an inorganic coating film disposed thereon resistant to spotting due to water droplets on the surface of the inorganic film, comprising a transparent organic resin opthalmic lens supporting a top layer anti-reflective SiO$_2$ coating film, the SiO$_2$ coating film having been treated with a compound which reacts with or is adsorbed to the surface of the film to improve the water repellency properties of the SiO$_2$ coating film so as to have a contact angle with water between 89° and 132°, the compound selected from the group consisting of (1) halogenated silane compounds;
(2) silane compounds having a structure including at least one bond selected from the group consisting of Si-SH and Si-SR wherein R is an organic group;
(3) silane compounds having the structure $$-\underset{|}{\mathrm{Si}}-\underset{|}{\overset{R3}{\mathrm{N}}}-\underset{|}{\mathrm{Si}}-$$

wherein R3 is hydrogen or an organic group;
(4) organic compounds having fluorine substituting groups selected from
(i) acyl halides represented by the formula:

$$\mathrm{Rf}-\underset{\underset{O}{\|}}{\mathrm{C}}-\mathrm{X}$$

wherein Rf is an organic group partially substituted by fluorine and X is halogen;
(ii) ammonium salt represented by the formula:

$$\mathrm{RfR_3N^+Y^-}$$

wherein Rf is an organic group partially substituted by fluorine, R is an alkyl group having 1 to 3 carbon atoms, and Y$^-$ is an anion selected from the group consisting of halogen ions, sulfate ions and carboxylic acid ions;
(iii) isocyanate esters represented by Rf—N=C=O and thiocyanate esters represented by Rf—N=C=S, wherein Rf is an organic group partially substituted by fluorine;
(iv) hydrogen fluoride; and
(v) a metal fluorides.

15. The improved synthetic resin ophthalmic lens of claim 14, wherein the compound is an organic compound having a metal fluoride substituting group and the metal fluoride is selected from the group consisting of NaF, NaHF$_2$, CaF$_2$, AlF$_3$, ZnF$_2$, SbF$_3$, SbF$_5$, CrF$_3$, KF, CoF$_3$, MgF$_2$, TlF, FeF$_2$, FeF$_3$, NiF$_2$ and BaF$_2$.

16. The improved synthetic resin ophthalmic lens of claim 14, wherein the inorganic coating film on the resin ophthalmic lens consists essentially of the SiO$_2$ coating film and the compound which reacts with or is adsorbed to the surface of the film.

17. The improved synthetic resin opthalmic lens of claim 14, wherein the compound is a halogenated silane compound having the formula Si-X wherein X is halogen.

18. The improved synthetic resin opthalmic lens of claim 14, wherein the compound is a silane having an Si-SH linkage.

19. The improved synthetic resin opthalmic lens of claim 14, wherein the compound is a silane having an Si-SR linkage, wherein R is an organic group.

20. The improved synthetic resin opthalmic lens of claim 14, wherein the compound is a silane including the structure

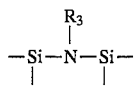

wherein R3 is hydrogen or an organic group.

21. The improved synthetic resin opthalmic lens of claim 14, wherein the compound is selected from the group consisting of:

(i) acyl halides represented by the formula:

wherein Rf is an organic group partially substituted by fluorine and X is halogen;

(ii) ammonium salts represented by the formula:

$RfR_3N^+Y^-$ wherein Rf is an organic group partially substituted by fluorine, R is an alkyl group having 1 to 3 carbon atoms, and $Y^-$ is anion such as halogen ion, sulfate ion and carboxylic acid ion; and (iii) isocyanate esters represented by Rf—N=C=O and thioisocyanate esters represented by Rf—N=C=S wherein Rf is an organic group partially substituted by fluorine including compounds wherein Rf are those represented by the formulae (I), (II) and (III)

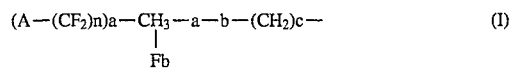

wherein A is a fluorine atom or a hydrogen atom, n is an integer from 1 to 18, a is 1 or 2, b is 0 or 1 and c is an integer from 0 to 2

wherein m is an integer from 0 to 17, d is an integer from 0 to 5 and R' is alkyl group having 1 to 5 carbon atoms

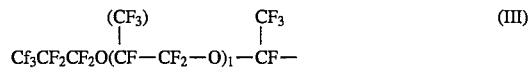

wherein 1 is an integer from 0 to 5.

22. The improved synthetic resin opthalmic lens of claim 14, wherein an $SiO_2$ layer is disposed on the synthetic resin opthalmic lens substrate, a $ZrO_2$ layer is disposed on the $SiO_2$ layer; a second $SiO_2$ layer is disposed on the $ZrO_2$ layer; a second $ZrO_2$ layer is disposed on the second $SiO_2$ layer; and a third $SiO_2$ layer is disposed on the second $ZrO_2$ layer, the third $SiO_2$ layer being the top layer treated with the silane compound.

* * * * *